(12) United States Patent
Franciskovich

(10) Patent No.: US 11,236,481 B1
(45) Date of Patent: Feb. 1, 2022

(54) PANNING DEVICE AND METHODS

(71) Applicant: Mark Franciskovich, Poplar Grove, IL (US)

(72) Inventor: Mark Franciskovich, Poplar Grove, IL (US)

(*) Notice: Subject to any disclaimer, the term of this patent is extended or adjusted under 35 U.S.C. 154(b) by 0 days.

(21) Appl. No.: 17/175,662

(22) Filed: Feb. 13, 2021

(51) Int. Cl.
*E02F 3/02* (2006.01)
*A01B 1/02* (2006.01)
*A01B 1/22* (2006.01)
*B07B 13/08* (2006.01)

(52) U.S. Cl.
CPC .............. *E02F 3/02* (2013.01); *A01B 1/02* (2013.01); *A01B 1/22* (2013.01); *B07B 13/08* (2013.01)

(58) Field of Classification Search
CPC .. B07B 13/08; B07B 1/02; A01B 1/02; A01B 1/22; E02F 3/02
USPC .......................................... 294/49, 176, 181
See application file for complete search history.

(56) References Cited

U.S. PATENT DOCUMENTS

| | | | | | |
|---|---|---|---|---|---|
| 1,080,903 | A | * | 12/1913 | Fell ........................... | A01B 1/02 294/49 |
| 1,387,127 | A | * | 8/1921 | Church .................... | A01B 1/08 172/381 |
| 2,068,046 | A | * | 1/1937 | Yardlay ................... | E03F 9/002 37/434 |
| 2,318,277 | A | * | 5/1943 | Yensen ................... | A01B 1/026 294/49 |
| 2,572,230 | A | * | 10/1951 | Williams .................. | F23J 1/04 294/53.5 |
| 2,839,982 | A | * | 6/1958 | Noell ...................... | A01G 20/30 172/381 |
| 2,960,230 | A | * | 11/1960 | Fracker .................... | B07B 1/02 209/419 |
| 4,162,969 | A | * | 7/1979 | Lagal ........................ | B03B 5/06 209/447 |
| 4,477,972 | A | * | 10/1984 | Testa, Jr. ............... | E04D 15/003 254/131.5 |
| 5,209,534 | A | * | 5/1993 | Crenshaw ................ | A01C 5/02 172/22 |
| 5,791,708 | A | * | 8/1998 | Capriotti .................. | E02F 3/02 172/377 |
| 9,096,988 | B2 | * | 8/2015 | Price ........................ | E02F 3/02 |

OTHER PUBLICATIONS

Forestry Suppliers, Conbar Telescopic Dipper, https://www.forestry-suppliers.com/product_pages/products.php?mi=65701&itemnum=53952&redir=Y (retrieved Feb. 13, 2021).

* cited by examiner

*Primary Examiner* — Dean J Kramer
(74) *Attorney, Agent, or Firm* — Braun IP Law, LLC; Jeanette M. Braun

(57) ABSTRACT

A panning tool is described and comprises a sifting scoop comprising an elongated half sphere of proportional dimensions. The elongated half sphere can be a one-piece main body comprising a floor with a front edge, a left side wall curving upwardly along the floor's left side, a right side wall curving upwardly along the floor's right side, and a back wall curving upwardly from the floor's back side. The left side wall, right side wall, and back wall define a reservoir. The floor extends forwardly from the back side. The panning tool comprises a connection body. The connection body is affixed to an interior face of the sifting scoop. Methods of using the panning tool and manufacturing the sifting scoop are also described.

17 Claims, 4 Drawing Sheets

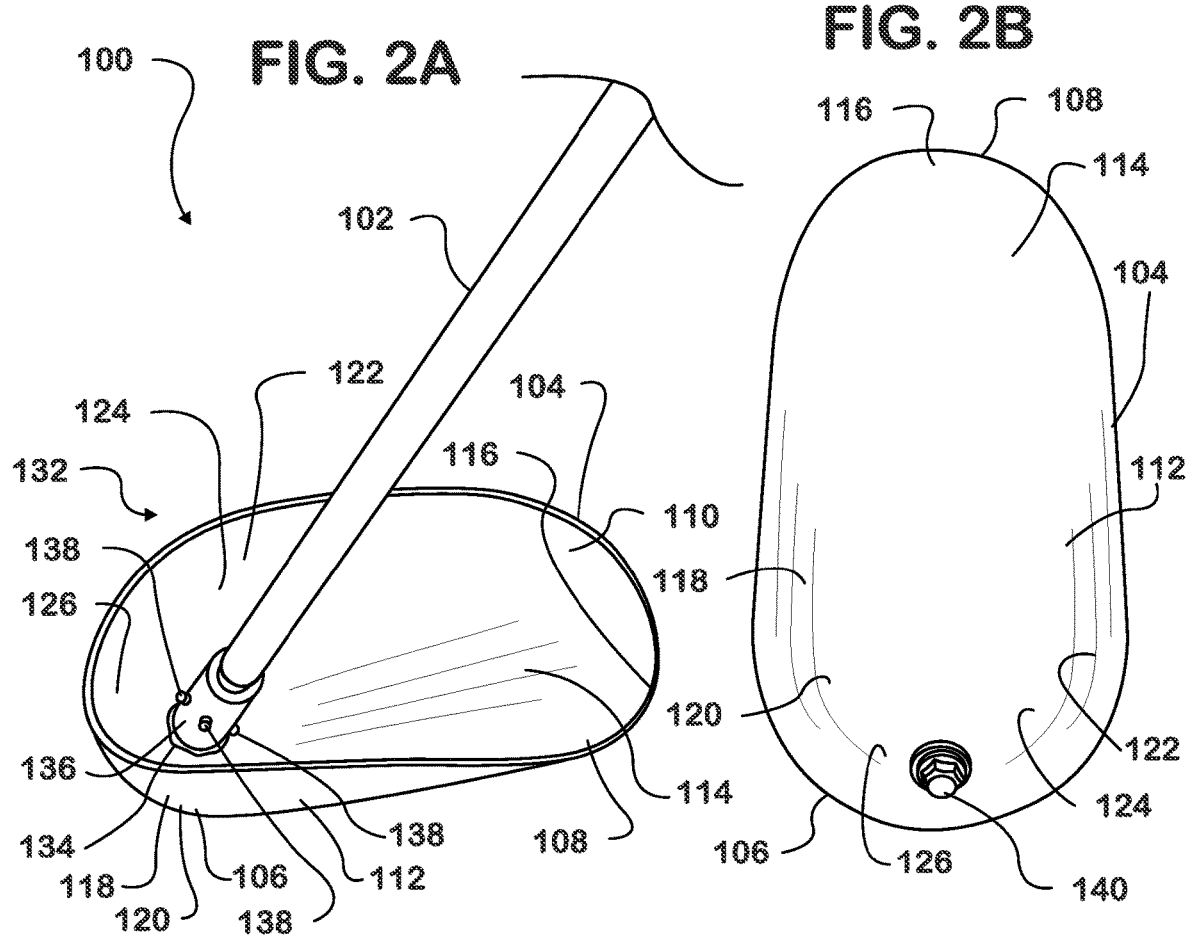
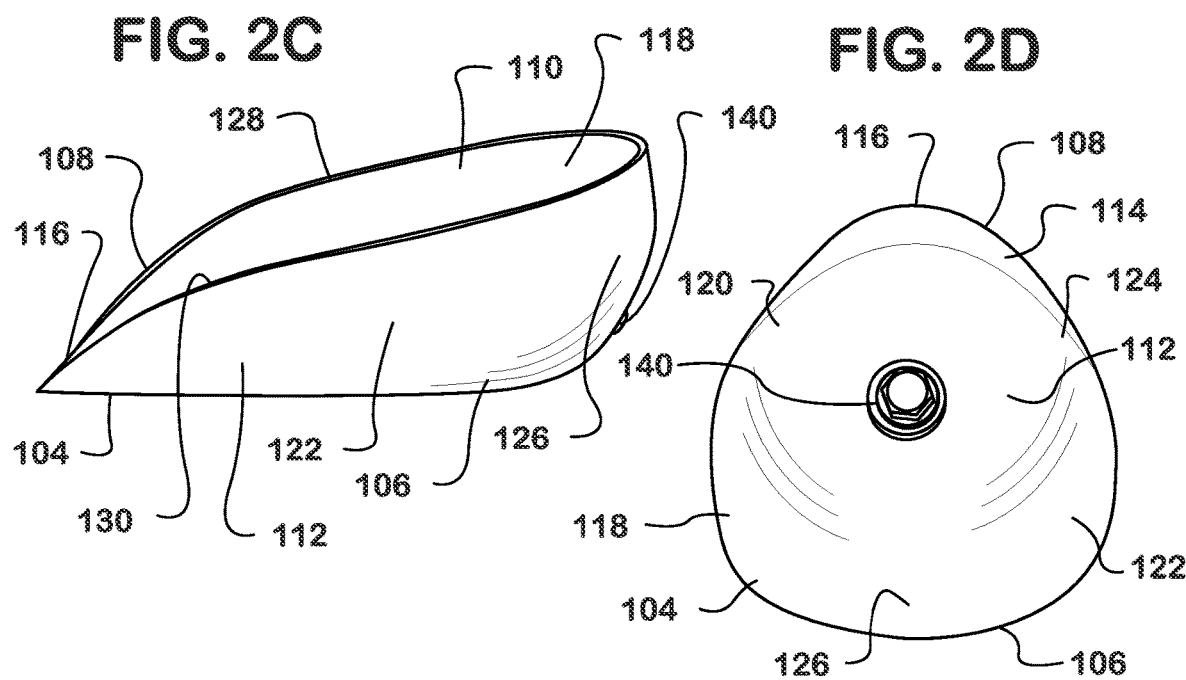

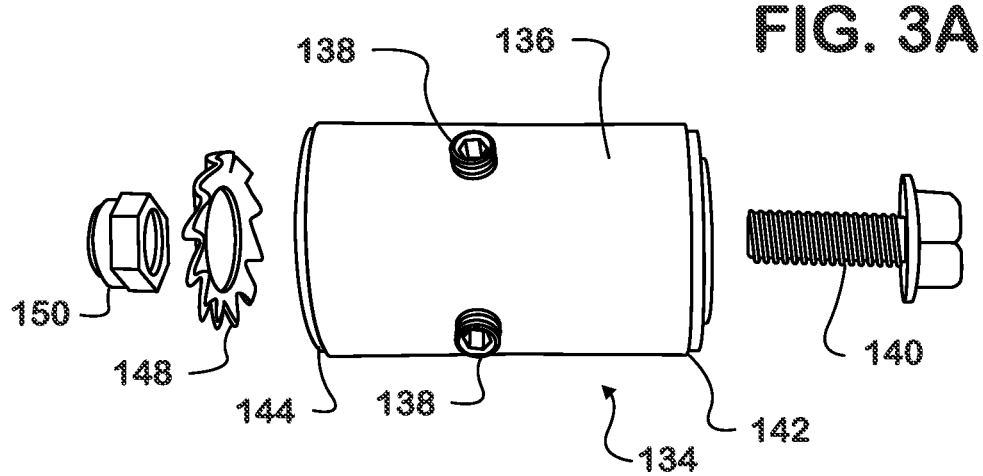
FIG. 3A
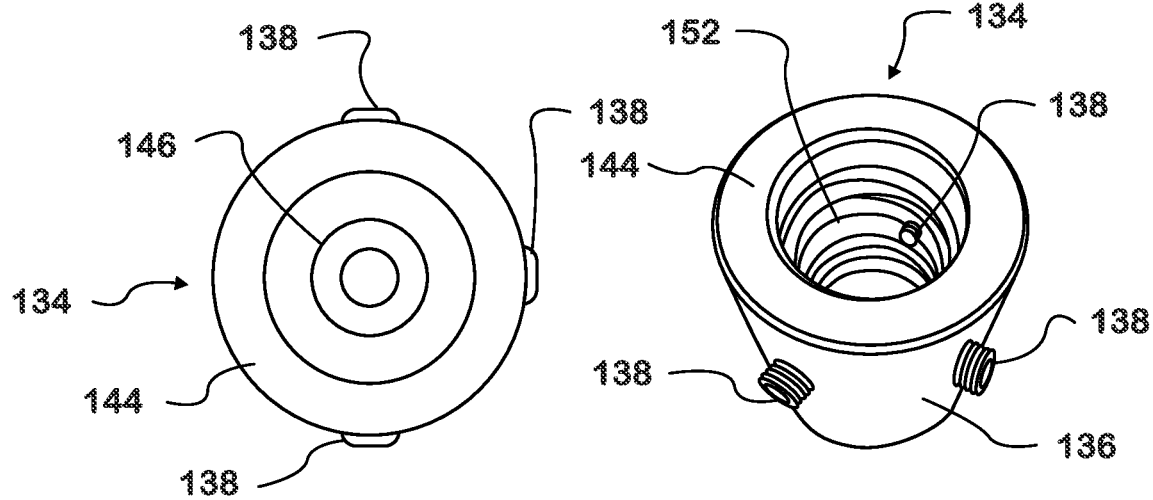
FIG. 3B
FIG. 3C
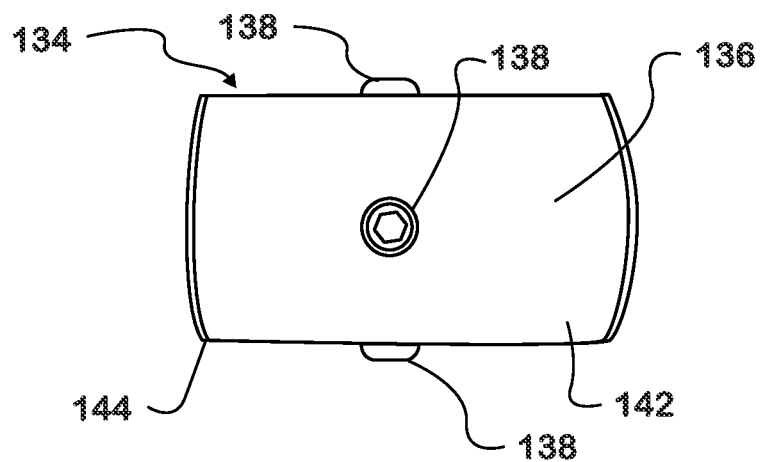
FIG. 3D

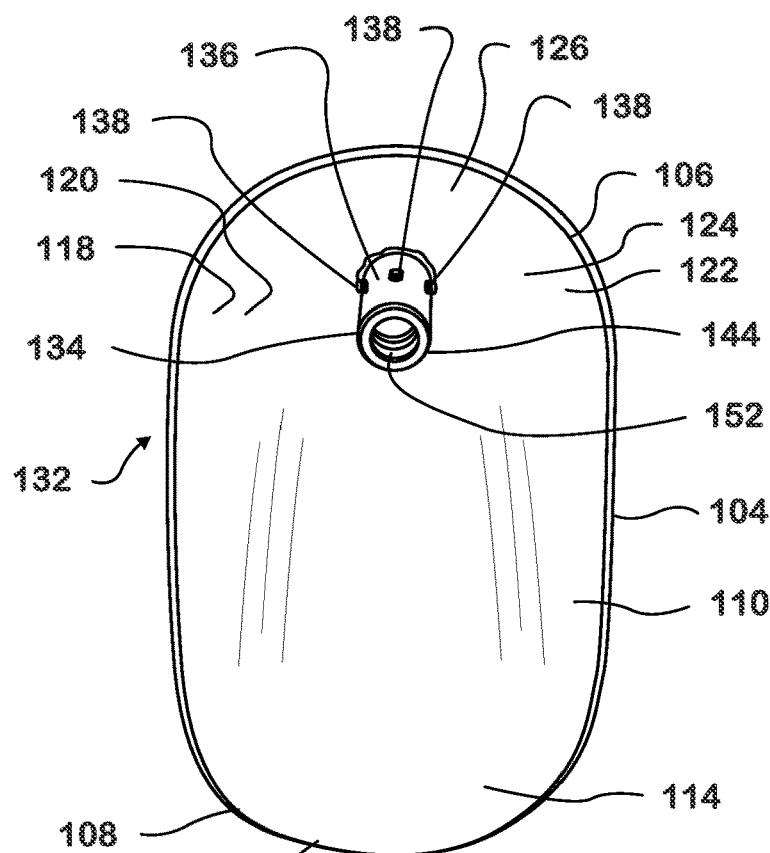
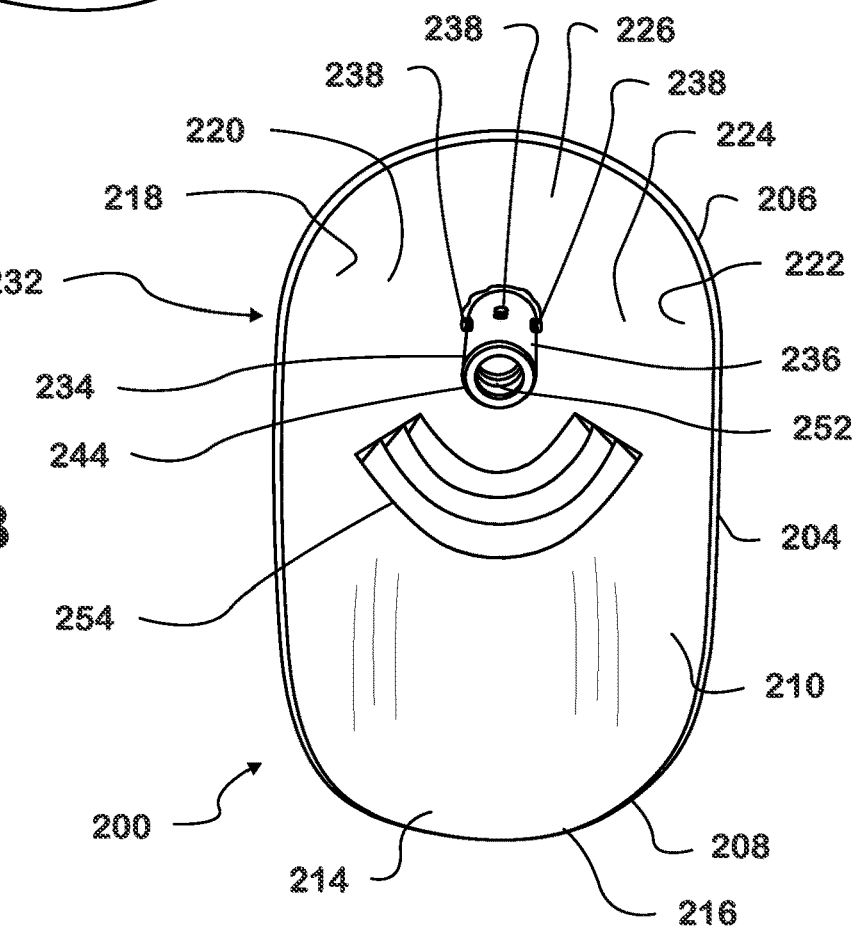

US 11,236,481 B1

PANNING DEVICE AND METHODS

FIELD OF THE DISCLOSURE

The disclosure generally relates to a panning tool for panning heavy elements, such as gold, silver, platinum, jewels, gems, or any other precious materials ("gold panning").

BACKGROUND OF THE DISCLOSURE

Gold panning can be performed by using manually powered tools. However, these manually powered tools are labor intensive, and require users to crouch during use.

Gold panning and methods of gold panning are highly regulated. For example, machines, pumps, or battery-powered devices cannot be used while gold panning. Gold and gems can be found several inches below the floor of a body of water or a dry land area. Typically, gold and gems are trapped under sediment. If gold and gems are found under the floor, holes cannot be left in the floor. This is difficult to accomplish due to the weight of the gold and sediment collected, along with the water's buoyant forces.

As a result, improvements in the field of gold and gem prospecting are needed, in order to maintain human health, reduce injury, comply with various regulations, and ensure practical and safe collection of gold and gems.

SUMMARY OF THE DISCLOSURE

Systems and methods directed to a panning device are disclosed. A method of manufacturing a sifting scoop is also disclosed.

A panning tool is disclosed. The panning tool comprises a sifting scoop comprising a one-piece main body. The one-piece main body can have an internal face and an external face. The one-piece main body may have a floor with a front edge, a left side wall curving upwardly along a left side of the floor, a right side wall curving upwardly from a right side of the floor, and a back wall curving upwardly from a back side of the floor. The left side wall, right side wall, and back wall can cooperate to define a reservoir. The floor may extend forwardly from the back side. The panning tool may also have a connection body comprising a top end, a bottom end, a central throughbore that can be adapted to receive a fastener, and at least two openings that may accept a setting screw threaded through an external face of the connection body. The connection body may also be affixed to the interior face of the sifting scoop.

The panning tool can be an elongated half sphere of proportional dimensions and can comprise a top edge that angles down from the top to the bottom.

A method of panning precious metals is also disclosed. The method may comprise inserting a rod into a connection assembly on a back end of the sifting scoop, described in the disclosure for the panning tool, to form the panning tool. The panning tool can be placed into a body of water or a dry land bed, and the sifting scoop can collect sediments from the body of water or dry land bed. The method may comprise isolating the precious metals from the second portion of the sediments. The method can comprise removing the sediments by gently shaking the sifting scoop.

A method of manufacturing a sifting scoop is further disclosed. The method may comprise machining the sifting scoop, wherein the sifting scoop may have a floor with a front edge, a left side wall curving upwardly along a left side of the floor, a right side wall curving upwardly from a right side of the floor, and a back wall curving upwardly from a back side of the floor. The method can also comprise forming an opening into an internal face of a back end of the sifting scoop. The method may also comprise inserting a connection assembly into the opening located at the internal face of the back end of the sifting scoop.

These and other objects, features, and advantages of the present disclosure will become more readily apparent from the attached drawings and the detailed description of the preferred embodiments, which follow.

BRIEF DESCRIPTION OF THE DRAWINGS

FIG. 2A is a left perspective view of an exemplary embodiment the panning tool described in the present disclosure.

FIG. 2B is a bottom plan view of an exemplary embodiment of the sifting scoop described in the present disclosure.

FIG. 2C is a side view of an exemplary embodiment of the sifting scoop described in the present disclosure.

FIG. 2D is a rear plan view of an exemplary embodiment the sifting scoop described in the present disclosure.

FIG. 3A is an exploded view of an exemplary embodiment of the connection body described in the present disclosure.

FIG. 3B is a bottom plan view of an exemplary embodiment of the connection body described in the present disclosure.

FIG. 3C is a top plan view of an exemplary embodiment of the connection body described in the present disclosure.

FIG. 3D is a side view of an exemplary embodiment of the connection body described in the present disclosure.

FIG. 4A is a top perspective view of an exemplary embodiment of the internal face of the sifting scoop described in the present disclosure.

FIG. 4B is a top perspective view of an exemplary embodiment of the internal face of the sifting scoop, in another aspect of the present disclosure.

DETAILED DESCRIPTION

Figure 1:
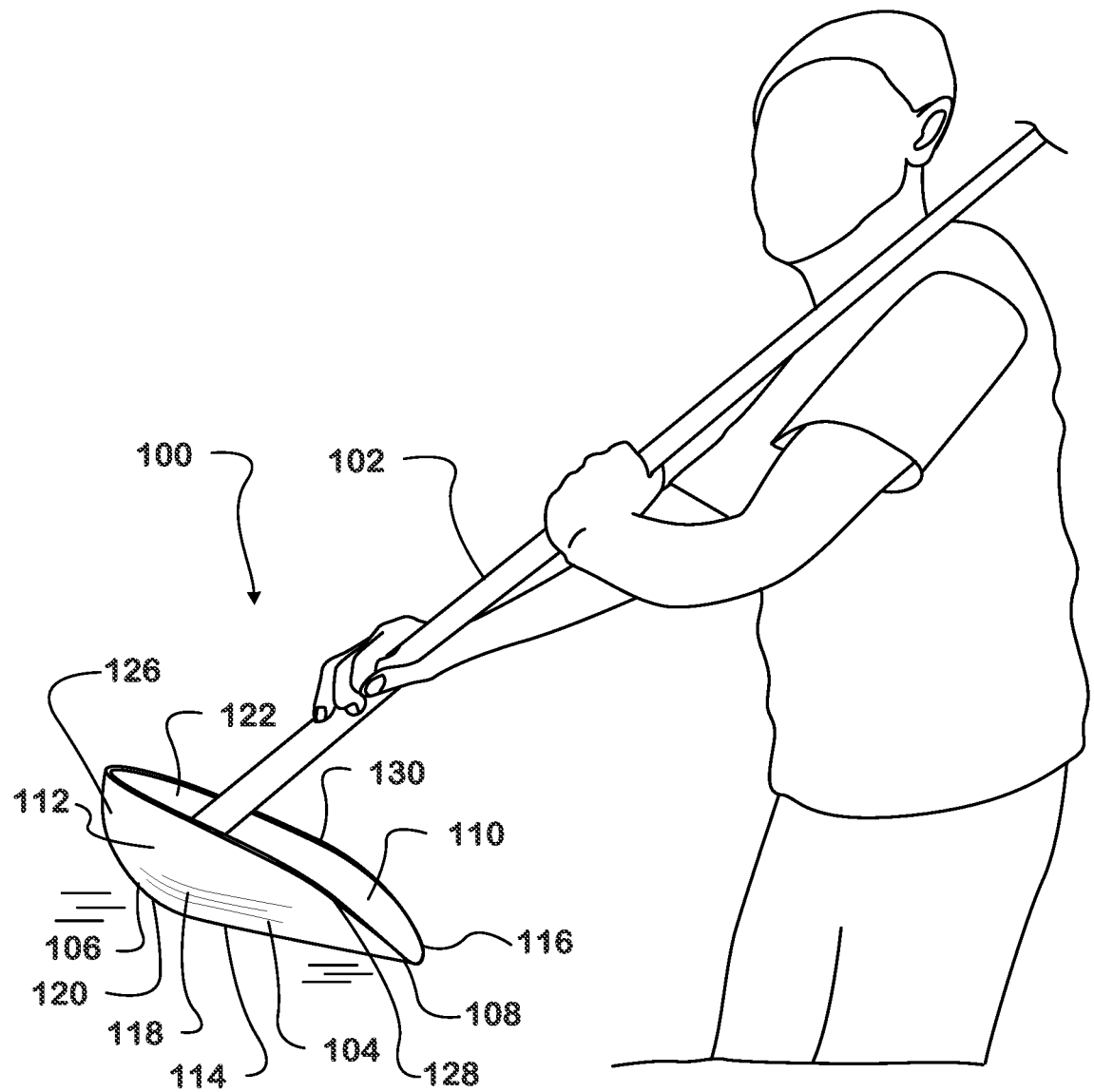
FIG. 1 is a perspective view of an exemplary embodiment of the panning tool described in the present disclosure.

The invention is defined by the claims. The description is exemplary in nature and should not be used to limit the claims. Other embodiments are contemplated in accordance with the techniques described herein; such embodiments are within the scope of this application. Further, there is no intent to be bound by any expressed or implied theory presented in this application. The words "exemplary" or "illustrative" mean "serving as an example, instance, or illustration." Any implementations described as "exemplary" or "illustrative" are not to be construed as preferred or advantageous over other implementations. All the implementations described below are exemplary implementations, in order to enable people skilled in the art to make or use the disclosed embodiments and are not intended to limit the scope of the disclosure, which is defined by the claims.

Some features may be described using relative terms, such as "upper," "lower," "left," "rear," "right," "front," "vertical," "horizontal." Such relative terms are only for reference with respect to the appended Figures and are not meant to limit the disclosed embodiments. Hence, specific dimensions and other physical characteristics relating to the disclosed embodiments are not meant to limit the claims, unless expressly stated otherwise in the claims.

FIG. 1 illustrates a perspective view of the panning tool 100. The panning tool 100 collects sediment that can have precious metals or gems and allows a user to stand while sifting the precious metals or gems out of the sediment and while operating the panning tool 100 in a body of water or dry land bed, not shown. The panning tool 100 can comprise an extendable rod 102 that can be removably engaged to a sifting scoop 104. The extendable rod 102 can be made of a material comprising aluminum, fiberglass, plastic, alloys, or combinations thereof. The panning tool 100 also comprises a sifting scoop 104. The sifting scoop 104 may have a back end 106 and a front end 108. The sifting scoop has an internal face 110 and an external face 112. The internal face 110 may have a floor 114, wherein the floor 114 may extend in a forward direction from the back end 106 and has a front edge 116. The front edge 116 of the floor 114 and portions of the floor 114 may be flat, which allows users to rest the sifting scoop 104, and the panning tool 100 generally, on the ground during use, not shown. The internal face 110 and external face 112 of the sifting scoop 104 may have a left sidewall 118. The left sidewall 118 of the internal face 110 of the sifting scoop 104 may curve upwardly along a left side 120 of the floor 114. The internal face 110 and external face 112 of the sifting scoop 104 may have a right sidewall 122. The right sidewall 122 of the internal face 110 of the sifting scoop 104 may curve upwardly along a right side 124 of the floor 114, as shown below in FIGS. 2C and 4A. The internal face 110 and external face 112 of the sifting scoop 104 may have a back sidewall 126. The back sidewall 126 of the internal face 110 of the sifting scoop 104 may curve upwardly from the floor 114 located at the back end 106 of the sifting scoop 104. The left sidewall 118 can have an edge 128 and the right sidewall 122 can have an edge 130. The edge 128 of the left sidewall 118 and the edge 130 of the right sidewall 122 may each have a downward slope from the back end 106 of the sifting scoop 104 to the front edge 116 of the floor 114 located on the internal face 110 of the sifting scoop 104. The downward slope of the edge 128 of the left sidewall 118 and the downward slope of the edge 130 of the right sidewall 122 allow the sifting scoop 104 to separate sediments and precious metals by density or specific gravity and remove sediments after use by shaking the sifting scoop 104 side to side. A reservoir 132 may be defined by the left sidewall 118, the left side 120 of the floor 114, the right sidewall 122, the right side 124 of the floor 114, and the back sidewall 126, as shown below in FIGS. 2A and 4A. The reservoir 132 may collect heavy elements, precious metals, or precious materials, not shown.

Generally, the shape of the sifting scoop 104 can be an elongate half sphere of proportional dimensions and comprise a top edge that extends on an angle from the top of the back to the front edge.

In some aspects of the present disclosure, the extendable rod 102 can be secured to the back end 106 of the sifting scoop 104's internal face 110 at an angle, wherein the angle has a range between 30°-60°. The extendable rod 102 can be secured to the internal face 110 of the back end 106 of the sifting scoop 104 through a connection body 134, shown below in FIGS. 2A and 3A-4B. In some aspects of the present disclosure, a first and second end of the extendable rod 102, not shown, can be male or female threaded and may be releasably engageable to the connection body 134. Securing the extendable rod 102 to the connection body 134 located at the back end 106 of the sifting scoop 104's internal face 110 may support the panning tool 100 during use. In some aspects of the present disclosure, the extendable rod 102 can be secured to the connection body 134 at the internal face of the front end 108 of the sifting scoop 104. In other aspects of the present disclosure, the connection body 134 may be placed at different locations of the floor 114 located in the internal face 110 of the sifting scoop 104, which may cause the extendable rod 102 to be secured to the connection body 134 at an alternate angle less than the angle described above. The extendable rod 102 can be removed after using the panning tool 100. The sifting scoop 104 can be made of a material comprising aluminum, plastic, steel, iron, alloys, or combinations thereof. The sifting scoop 104 material can be corrosion and rust resistant.

FIG. 2A illustrates a left-perspective view of the panning tool 100. The panning tool 100 may comprise the extendable rod 102. The extendable rod 102 can be made of material comprising aluminum, fiberglass, plastic, alloys, or combinations thereof. The sifting scoop 104 has the back end 106 and the front end 108. The sifting scoop also has the internal face 110 and the external face 112. The internal face 110 has the floor 114, wherein the floor 114 may extend in the forward direction from the back end 106 and has the front edge 116. The internal face 110 and external face 112 of the sifting scoop 104 may have the left sidewall 118. The left sidewall 118 of the internal face 110 of the sifting scoop 104 may curve upwardly along the left side 120 of the floor 114. The internal face 110 and external face 112 of the sifting scoop 104 may have the right sidewall 122. The right sidewall 122 of the internal face 110 of the sifting scoop 104 may curve upwardly along the right side 124 of the floor 114. The internal face 110 and external face 112 of the sifting scoop 104 may have the back sidewall 126. The back sidewall 126 of the internal face 110 of the sifting scoop 104 may curve upwardly from the floor 114 located at the back end 106 of the sifting scoop 104. The reservoir 132 may be defined by the left sidewall 118, the left side 120 of the floor 114, the right sidewall 122, the right side 124 of the floor 114, and the back sidewall 126. The reservoir 132 may collect sediments and precious metals.

An opening, not shown, may be bored into the back end 106 of the sifting scoop 104. In some aspects of the present disclosure, the opening, not shown, may be added to the back end 106 of the sifting scoop 104 through a mold, not shown. The opening located on the internal face 110 of the back end 106 of the sifting scoop 104 may receive the connection body 134. In some aspects of the present disclosure, the connection body 134 can be welded to the internal face 110 of the back end 106 of the sifting scoop 104. An external face 136 of the connection body 134 may have at least two openings oriented in opposite directions. At least two setting screws 138 may engage and enter the at least two openings located on the external face 136 of the connection body 134. In some aspects of the present disclosure, the at least two setting screws 138 may secure the extendable rod 102, shown in FIGS. 1 and 2A above, to the connection body 134. Each of the at least two setting screws 138 may secure the extendable rod 102 to the connection body 134. In some aspects of the present disclosure, the at least two setting screws 138 on the external face 136 of the connection body 134 may comprise a third setting screw 138, wherein the third setting screw 138 can be located at a perpendicular angle to the at least two setting screws 138. The third setting screw 138 may aid the at least two setting screws 138 in securing the extendable rod 102 to the connection body 134.

Securing the extendable rod 102 to the connection body 134 at the internal face 110 of the back end 106 of the sifting scoop 104 may support the panning tool 100 during use. In some aspects of the present disclosure, the connection body 134 and the extendable rod 102 can be secured at the angle defined above in FIG. 1. In some aspects of the present disclosure, the extendable rod 102 can be secured to the connection body 134 at the internal face 110 of the front end 108 of the sifting scoop 104. In other aspects of the present disclosure, the connection body 134 may be placed at different locations of the floor 114 located in the internal face 110 of the sifting scoop 104, which may cause the extendable rod 102 to be secured to the connection body 134 at an alternate angle less than the angle described above. The extendable rod 102 can be removed from the connection body 134 after using the panning tool 100.

FIG. 2B illustrates a bottom plan view of the sifting scoop 104. The sifting scoop 104 has the back end 106 and the front end 108. The sifting scoop also has the external face 112. The external face 112 of the sifting scoop 104 has the floor 114, wherein the floor 114 may extend in the forward direction from the back end 106 of the sifting scoop 104 and has the front edge 116. The front edge 116 of the floor 114 and portions of the floor 114 may be flat, which allows users to rest the sifting scoop 104 on the ground during use, not shown. The external face 112 of the sifting scoop 104 may have a left sidewall 118. The left sidewall 118 of the sifting scoop 104 may curve upwardly along a left side 120 of the floor 114. The external face 112 of the sifting scoop 104 may have a right sidewall 122. The right sidewall 122 of the sifting scoop 104 may curve upwardly along a right side 124 of the floor 114. The external face 112 of the sifting scoop 104 may have a back sidewall 126. The back sidewall 126 of the internal face 110 of the sifting scoop 104 may curve upwardly from the floor 114 located at the back end 106 of the sifting scoop 104. The reservoir 132, shown above in FIG. 2A, may be defined by the left sidewall 118, the left side 120 of the floor 114, the right sidewall 122, the right side 124 of the floor 114, and the back sidewall 126. The reservoir 132 may collect sediments and precious metals.

The opening, not shown, can be bored into the floor 114 and may be located at the back sidewall 126 of the sifting scoop 104. In some aspects of the present disclosure, the opening, not shown, may be added to the floor 114 and may be located at the back sidewall 126 of the sifting scoop 104 through a mold, not shown. A threaded screw 140 may fasten a bottom end 142 of the connection body 134, shown below in FIGS. 3A and 3D. In some aspects of the disclosure, the bottom end 142 of the connection body 134 may not enter the opening that may be located on the back sidewall 126 of the sifting scoop 104. The threaded screw 140 may protrude beyond the external face 112 of the back sidewall 126 of the sifting scoop 104. Fastening the bottom end 142 of the connection body 134 with the threaded screw 140 may prevent leakage of liquids from the sifting scoop 104. In some aspects of the disclosure, the threaded screw 140 may seal the connection body 134 to the sifting scoop 104.

FIG. 2C illustrates a side view of the sifting scoop 104. The internal face 110 and the external face 112 has the floor 114, shown above in FIG. 2A, wherein the floor 114 may extend in the forward direction from the back end 106 and has the front edge 116. The front edge 116 of the floor 114 and portions of the floor 114 may be flat, which allows users to rest the sifting scoop 104 on the ground during use, not shown. The internal face 110 of the sifting scoop 104 may have the left sidewall 118. The left sidewall 118 of the internal face 110 of the sifting scoop 104 may curve upwardly along a left side 120 of the floor 114, shown above in FIG. 2A. The external face 112 of the sifting scoop 104 may have a right sidewall 122. The right sidewall 122 of the internal face 110 of the sifting scoop 104 may curve upwardly along a right side 124 of the floor 114, shown above in FIG. 2A. The internal face 110 and external face 112 of the sifting scoop 104 may have a back sidewall 126. The back sidewall 126 of the internal face 110 of the sifting scoop 104 may curve upwardly from the floor 114 located at the back end 106 of the sifting scoop 104. The left sidewall 118 can have the edge 128 and the right sidewall 122 can have the edge 130. The edge 128 of the left sidewall 118 and the edge 130 of the right sidewall 122 may each have a downward slope from the back end 106 of the sifting scoop 104 to the front edge 116 of the floor 114 at the front end 108 of the sifting scoop 104. The downward slope of the edge 128 of the left sidewall 118 and the downward slope of the edge 130 of the right sidewall 122 allow the sifting scoop 104 to separate sediments and precious metals by density. The reservoir 132, shown above in FIG. 2A, may be defined by the left sidewall 118, the left side 120 of the floor 114, the right sidewall 122, the right side 124 of the floor 114, and the back sidewall 126. The reservoir 132, shown above in FIG. 2A, may collect heavy elements, precious metals, or precious materials.

The opening, not shown, can be bored into the floor 114 and may be located at the back sidewall 126 of the sifting scoop 104. In some aspects of the present disclosure, the opening, not shown, may be added to the floor 114 and may be located at the back sidewall 126 of the sifting scoop 104 through a mold, not shown. A threaded screw 140 may fasten a bottom end 142 of the connection body 134, shown below in FIGS. 3A and 3D. In some aspects of the disclosure, the bottom end 142 of the connection body 134 may not enter the opening that may be located on the back sidewall 126 of the sifting scoop 104. The threaded screw 140 may protrude beyond the external face 112 of the back sidewall 126 of the sifting scoop 104. Fastening the bottom end 142 of the connection body 134 with the threaded screw 140 may prevent leakage of liquids from the sifting scoop 104. In some aspects of the disclosure, the threaded screw 140 may seal the connection body 134 to the sifting scoop 104.

FIG. 2D illustrates a rear plan view of the sifting scoop 104. The sifting scoop 104 has the back end 106 and the front end 108. The sifting scoop also has the external face 112. The external face 112 has the floor 114, wherein the floor 114 may extend in the forward direction from the back end 106 and has the front edge 116. The front edge 116 of the floor 114 and portions of the floor 114 may be flat, which allows users to rest the sifting scoop 104, and the panning tool 100 generally, on the ground during use, not shown. The external face 112 of the sifting scoop 104 may have the left sidewall 118. The left sidewall 118 of the internal face 110 of the sifting scoop 104 may curve upwardly along the left side 120 of the floor 114. The external face 112 of the sifting scoop 104 may have the right sidewall 122. The right sidewall 122 of the internal face 110 of the sifting scoop 104 may curve upwardly along the right side 124 of the floor 114. The internal face 110 and external face 112 of the sifting scoop 104 may have the back sidewall 126. The back sidewall 126 of the internal face 110 of the sifting scoop 104 may curve upwardly from the floor 114 located at the back end 106 of the sifting scoop 104. The reservoir 132, shown above in FIG. 2A, may be defined by the left sidewall 118, the left side 120 of the floor 114, the right sidewall 122, the right side 124 of the floor 114, and the back sidewall 126.

The opening, not shown, can be bored into the floor 114 and may be located at the back sidewall 126 of the sifting scoop 104. In some aspects of the present disclosure, the opening, not shown, may be added to the floor 114 and may be located at the back sidewall 126 of the sifting scoop 104 through a mold, not shown. A threaded screw 140 may fasten a bottom end 142 of the connection body 134, shown below in FIGS. 3A and 3D. In some aspects of the disclosure, the bottom end 142 of the connection body 134 may not enter the opening that may be located on the back sidewall 126 of the sifting scoop 104. The threaded screw 140 may protrude beyond the external face 112 of the back sidewall 126 of the sifting scoop 104. Fastening the bottom end 142 of the connection body 134 with the threaded screw 140 may prevent leakage of liquids from the sifting scoop 104. In some aspects of the disclosure, the threaded screw 140 may seal the connection body 134 to the sifting scoop 104.

FIG. 3A illustrates an exploded view of the connection body 134. An external face 136 of the connection body 134 may have at least two openings oriented in opposite directions. At least two setting screws 138 may engage and enter the at least two openings located on the external face 136 of the connection body 134. In some aspects of the present disclosure, the at least two setting screws 138 may secure the extendable rod 102, shown in FIGS. 1 and 2A above, to the connection body 134. Each of the at least two setting screws 138 may clamp the extendable rod 102 to the connection body 134. In some aspects of the present disclosure, the at least two setting screws 138 on the external face 136 of the connection body may comprise at least a three setting screws 138, shown below in FIGS. 3B-3D, wherein the at least three setting screws 138 can be located at a perpendicular angle to the at least two setting screws 138. The third setting screw 138 may aid the at least two setting screws in clamping and securing the extendable rod 102 to the connection body 134. The connection body 134 has the bottom end 142 and a top end 144.

The threaded screw 140 may fasten the bottom end 142 of the connection body 134. Fastening the bottom end 142 of the connection body 134 with the threaded screw 140 may prevent leakage of liquids from the sifting scoop 104, not shown. In some aspects of the disclosure, the threaded screw 140 may seal the connection body 134 to the sifting scoop 104, shown above in FIGS. 2B-2D.

In an exploded view, a fastener 146, shown below in FIG. 3C, may comprise a crimp washer 148 and a lock nut 150. The fastener 146 may be formed by joining the crimp washer 148 and the lock nut 150 and inserted into a central throughbore 152 of the connection body 134. The central throughbore 152 of the connection body 134 may be adapted to receive the fastener 146. In some aspects of the present disclosure, the extendable rod may engage the fastener 146 located in the central throughbore 152. In some aspects of the present disclosure, the central throughbore may have male or female threading. In some aspects of the present disclosure, a first end and a second end of the extendable rod may have male or female threading, and matingly engage the male or female threading of the central throughbore 152 of the connection body 134.

FIG. 3B illustrates a top plan view of the connection body 134. The external face 136 of the connection body 134 may have at least two openings oriented in opposite directions. At least two setting screws 138 may engage and enter the at least two openings located on the external face 136 of the connection body 134. In some aspects of the present disclosure, the at least two setting screws 138 may secure the extendable rod 102, shown in FIGS. 1 and 2A above, to the connection body 134. Each of the at least two setting screws 138 may clamp the extendable rod 102 to the connection body 134. In some aspects of the present disclosure, the at least two setting screws 138 on the external face 136 of the connection body may comprise at least a third setting screw 138, shown below in FIGS. 3B-3D, wherein the third setting screw 138 can be located at a perpendicular angle to the at least two setting screws 138. The third setting screw 138 may aid the at least two setting screws in clamping and securing the extendable rod 102 to the connection body 134. The central throughbore 152 located near the top end 144 of the connection body 134 may be adapted to receive the fastener 146 after male or female threading the central throughbore 152, seen below in FIG. 3C. In some aspects of the present disclosure, the extendable rod 102 may engage with the fastener 146 located in the central throughbore 152 of the connection body 134.

FIG. 3C illustrates a top plan view of the connection body 134. An external face 136 of the connection body 134 may have at least two openings oriented in opposite directions. At least two setting screws 138 may engage and enter the at least two openings located on the external face 136 of the connection body 134. In some aspects of the present disclosure, the at least two setting screws 138 may secure the extendable rod 102, shown in FIGS. 1 and 2A above, to the connection body 134. Each of the at least two setting screws 138 may clamp the extendable rod 102 to the connection body 134. In some aspects of the present disclosure, the at least two setting screws 138 on the external face 136 of the connection body may comprise at least a third setting screw 138, wherein the third setting screw 138 can be located at a perpendicular angle to the at least two setting screws 138. The central throughbore 152 located near the top end 144 of the connection body 134 may have male or female threading. In some aspects of the present disclosure, a first end and a second end of the extendable rod 102, shown above in FIGS. 1 and 2A, may have male or female threading, and matingly engage the male or female threading of the central throughbore 152 of the connection body 134. The central throughbore 152 is adapted to securely receive an end of an extendable rod 102 and allow the end of an extendable rod 102 to be removed from the central throughbore 152.

FIG. 3D illustrates a side view of the connection body 134. An external face 136 of the connection body 134 may have at least two openings oriented in opposite directions. At least two setting screws 138 may engage and enter the at least two openings located on the external face 136 of the connection body 134. In some aspects of the present disclosure, the at least two setting screws 138 may secure the extendable rod 102, shown in FIGS. 1 and 2A above, to the connection body 134. Each of the at least two setting screws 138 may clamp the extendable rod 102 to the connection body 134. In some aspects of the present disclosure, the at least two setting screws 138 on the external face 136 of the connection body may comprise at least a third setting screw 138, wherein the at least third setting screw 138 can be located at a perpendicular angle to the at least two setting screws 138. The third setting screw 138 may aid the at least two setting screws 138 in clamping and securing the extendable rod 102 to the connection body 134. The connection body 134 also has the bottom end 142 and the top end 144. The threaded screw 140 secures the bottom end 142 of the connection body 134 and prevents leakage of fluids from the sifting scoop 104, as described above in FIGS. 2B-2D. The fastener 146, shown above in FIG. 3B, enters the central throughbore 152 near the top end 144 of the connection body 134. In some aspects of the present disclosure, the extendable rod 102, shown above in FIGS. 1 and 2A, may be secured to the fastener 146 located in the central throughbore 152 of the connection body 134. In other aspects of the disclosure, a first end and a second end of the extendable rod 102, shown above in FIGS. 1 and 2A, may have male or female threading, and matingly engage male or female threading located in the central throughbore 152 of the connection body 134.

FIG. 4A illustrates a top perspective view of the sifting scoop 104. The sifting scoop 104 may have the back end 106 and the front end 108. The sifting scoop has the internal face 110. The internal face 110 may have the floor 114, wherein the floor 114 may extend in the forward direction from the back end 106 and has the front edge 116. The front edge 116 of the floor 114 and portions of the floor 114 may be flat, which allows users to rest the sifting scoop 104 on the ground during use, not shown. The internal face 110 of the sifting scoop 104 may have the left sidewall 118. The left sidewall 118 of the internal face 110 of the sifting scoop 104 may curve upwardly along the left side 120 of the floor 114. The internal face 110 of the sifting scoop 104 may have the right sidewall 122. The right sidewall 122 of the internal face 110 of the sifting scoop 104 may curve upwardly along the right side 124 of the floor 114. The internal face 110 of the sifting scoop 104 may have the back sidewall 126. The back sidewall 126 of the internal face 110 of the sifting scoop 104 may curve upwardly from the floor 114 located at the back end 106 of the sifting scoop 104. The reservoir 132 may be defined by the left sidewall 118, the left side 120 of the floor 114, the right sidewall 122, the right side 124 of the floor 114, and the back sidewall 126. The reservoir 132 may collect sediments and precious metals, not shown.

The opening, not shown, can be bored into the internal face 110 of the back end 106 of the sifting scoop 104. In some aspects of the present disclosure, the opening, not shown, may be added to the back end 106 of the sifting scoop 104 through a mold, not shown. The opening located at the back end 106 of the sifting scoop 104 may receive the connection body 134. In some aspects of the disclosure, the connection body 134 may be placed into the opening located at the back end 106 of the sifting scoop 104 at the angle defined above in FIG. 1. In some aspects of the disclosure, the connection body 134 can be welded to the internal face 110 of the back end 106 of the sifting scoop 104. An external face 136 of the connection body 134 may have at least two openings oriented in opposite directions. At least two setting screws 138 may engage and enter the at least two openings located on the external face 136 of the connection body 134. In some aspects of the present disclosure, the at least two setting screws 138 may secure the extendable rod 102, shown in FIGS. 1 and 2A above, to the connection body 134. Each of the at least two setting screws 138 may clamp the extendable rod 102 to the connection body 134. In some aspects of the present disclosure, the at least two setting screws 138 on the external face 136 of the connection body may comprise at least three setting screws 138, wherein the third setting screw 138 can be located at a perpendicular angle to the at least two setting screws 138. The setting screw 138 may aid the at least two setting screws 138 in clamping and securing the extendable rod 102 to the connection body 134. In some aspects of the present disclosure, the extendable rod 102, shown above in FIGS. 1 and 2A, may be secured to the fastener 146 located in the central throughbore 152 of the connection body 134. In other aspects of the disclosure, a first end and a second end of the extendable rod 102, shown above in FIGS. 1 and 2A, may have male or female threading, and matingly engage male or female threading located in the central throughbore 152 of the connection body 134.

The sifting scoop 104 can separate sediments from heavy elements, precious metals, or precious materials, not shown, by density or specific gravity. Sediment may have a lower density, or a different specific gravity than, the heavy elements, precious metals, or precious materials, which allows sediments to be separated by shaking the sifting scoop 104, not shown. The sediments may be removed from the panning tool 100 by shaking the sifting scoop 104, shown above in FIG. 1, and the heavy elements, precious materials, or precious metals will stay in the sifting scoop 104. In some aspects of the disclosure, the sifting scoop 104 can be made of a rigid material comprising aluminum, plastic, steel, iron, alloys, or combinations thereof. The sifting scoop 104 material can be corrosion and rust resistant.

FIG. 4B illustrates a top perspective view of a sifting scoop 204 of a panning tool 200, in another aspect of the disclosure. The sifting scoop 204 may have a back end 206 and a front end 208. The sifting scoop has an internal face 210 and an external face 212, not shown. The internal face 210 may have a floor 214, wherein the floor 214 may extend in a forward direction from the back end 206 and has a front edge 216. The front edge 216 of the floor 214 and portions of the floor 214 may be flat, which allows users to rest the sifting scoop 204, and the panning tool 200 generally, on the ground during use, not shown. The internal face 210 of the sifting scoop 204 may have a left sidewall 218. The left sidewall 218 of the internal face 210 of the sifting scoop 204 may curve upwardly along a left side 220 of the floor 214. The internal face 210 of the sifting scoop 204 may have a right sidewall 222. The right sidewall 222 of the internal face 210 of the sifting scoop 204 may curve upwardly along a right side 224 of the floor 214. The internal face 210 of the sifting scoop 204 may have the back sidewall 226. The back sidewall 226 of the internal face 210 of the sifting scoop 204 may curve upwardly from the floor 214 located at the back end 206 of the sifting scoop 204. A reservoir 232 may be defined by the left sidewall 218, the left side 220 of the floor 214, the right sidewall 222, the right side 224 of the floor 214, and the back sidewall 226. The reservoir 232 may collect sediments and precious metals, not shown.

An opening, not shown, may be bored into the internal face 210 of the sifting scoop 204's back end 206. In some aspects of the present disclosure, the opening, not shown, may be added to the internal face 210 of the sifting scoop 204's back end 206 through a mold, not shown. The opening, not shown, located at the internal face 210 of the sifting scoop 204's back end 206 may receive the connection body 234. In some aspects of the disclosure, the connection body 234 may be placed into the opening, not shown, located at the internal face 210 of the sifting scoop 204's back end 206 at the angle defined above in FIG. 1. In some aspects of the disclosure, the connection body 234 may be welded to the internal face 210 of the of the sifting scoop 204's back end. An external face 236 of the connection body 234 may have at least two openings oriented in opposite directions. At least two setting screws 238 may engage and enter the at least two openings located on the external face 236 of the connection body 234. In some aspects of the present disclosure, the at least two setting screws 238 may secure the extendable rod 202, not shown, to the connection body 234. Each of the at least two setting screws 238 may clamp the extendable rod 202, not shown, to the connection body 234. In some aspects of the present disclosure, the at least two setting screws 238 on the external face 236 of the connection body may comprise a third setting screw 238, wherein the third setting screw 238 can be located at a perpendicular angle to the at least two setting screws 238. The third setting screw 238 may aid the at least two setting screws 238 in clamping and securing the extendable rod 202, not shown, to the connection body 234. In some aspects of the disclosure, a first end and a second end of the extendable rod 202, not shown, may have male or female threading, and matingly engage male or female threading located in a central throughbore 152 of the connection body 134.

In some aspects of the disclosure, the sifting scoop 204 has riffles 254 located on the internal face 210 of the sifting scoop 204's back end 206. The riffles 254 may separate sediments, not shown, by density or specific gravity. A sample of sediments may be collected at the sifting scoop 204, not shown. The heavy elements, precious metals, or precious materials are mixed in with the sediment and the sediment can have a lower density than the heavy elements, precious metals, or precious materials, such as precious gems, comprising quartz, amethyst, agate, alloys or combinations thereof. The heavy elements, precious metals, or precious materials can be collected at the back end 206 of the sifting scoop 204 in the area defined as the reservoir 232, and may comprise precious metals comprising gold, silver, platinum, alloys, or combinations thereof. The riffles 254 may isolate and separate the precious metals from the sediment, not shown, due to their density or specific gravity, which is different that the density or specific gravity of the sediment. The sediment may comprise a lower density than the precious metals or heavy elements. As the sediment containing the heavy elements or precious metals or materials travel over the riffles 254, the heavy elements are caught by the riffles 254, and the sediment flows over the riffles 254. Some of the heavy elements, precious metals, or precious materials can be collected in the reservoir 232 of the sifting scoop 204 prior to shaking the sifting scoop 204, or within the first few moments of shaking the sifting scoop 204, because of their density and/or specific gravity. The sediments can travel forward and over the riffles 254 and may ultimately exit the panning tool 200 from the front edge 216 located at the front end 208 by shaking the panning tool 200 side to side.

Since many modifications, variations, and changes in detail can be made to the described preferred embodiments of the invention, it is intended that all matters in the foregoing description and shown in the accompanying drawings be interpreted as illustrative and not in a limiting sense.

Although some, and maybe preferred, embodiments of the disclosure have been described in detail herein, those skilled in the art will recognize that various substitutions and modifications may be made without departing from the scope and spirit of the appended claims. Thus, the scope of the invention should be determined by the appended claims and their legal equivalent.

I claim:

1. A panning tool, comprising:
   a sifting scoop comprising an elongated half sphere of proportional dimensions comprising a top edge extending on a downward angle from a back end to a front end of the sifting scoop, wherein the sifting scoop further comprises a one-piece main body having an internal face and an external face, wherein the main body of the sifting scoop comprises a floor with a front edge, a left side wall curving upwardly along a left side of the floor, a right side wall curving upwardly from a right side of the floor, and a back wall curving upwardly from a back side of the floor, and the left side wall, right side wall, and back wall cooperate to define a reservoir and the floor extends forwardly from the back side; and riffles molded into the floor and transverse the one-piece main body from the left side wall to the right side wall, starting from the back end and extending forward to a central region of the sifting scoop; and
   a connection body comprising a top end, a bottom end, a central throughbore being adapted to receive a fastener, and at least two openings for accepting a setting screw threaded through an external face of the connection body, wherein the connection body is affixed to an interior face of the sifting scoop.

2. The panning tool of claim 1, wherein the riffles separate heavy elements from sediment based on density or specific gravity.

3. The panning tool of claim 1, further comprising an extendable rod having a top end and a bottom end, wherein the top end and the bottom end of the extendable rod are threaded, and further wherein either the top end or the bottom end of the extendable rod is releasably engaged to the connection body.

4. The panning tool of claim 1, wherein the sifting scoop is made of a material that resists rust and corrosion.

5. The panning tool of claim 1, wherein the bottom end of the connection body is affixed to the sifting scoop through an opening located at a back end of the sifting scoop and the top end of the connection body receives an end of a rod.

6. The panning tool of claim 5, wherein a threaded screw is engaged to the connection body by joining the threads of the threaded screw to threads inside the connection body and mates the bottom end of the connection body to the sifting scoop.

7. The panning tool of claim 1, further comprising the connection body being centrally adjoined to a rear portion of the bottom of the sifting scoop at an angle between 30°-60°.

8. A method of panning precious metals, the method comprising:
   inserting an extendable rod into a connection body on the back end of the sifting scoop of claim 1 to form a panning tool;
   dropping the front end of the panning tool into a sediment bed in a body of water;
   collecting sediments and water with the sifting scoop;
   shaking the panning tool side to side;
   separating the sediments from heavy elements contained in the sediment with the sifting scoop, wherein the separating occurs based on density or specific gravity of the heavy elements, and further wherein the back end of the sifting scoop collects a heaviest set of elements;
   isolating the heavy elements from the sediment; and
   removing the sediments and water by shaking the sifting scoop.

9. The method of claim 8, wherein the two openings for accepting a setting screw threaded through the external face of the connection body secures an end of a rod to the connection body when the two openings for accepting the setting screw each receive a setting screw.

10. The method of claim 8, further comprising joining the connection body to the sifting scoop at an angle between 30°-60°.

11. The method of claim 8, further comprising welding a joint between the connection body and a reservoir of the sifting scoop.

12. The method of claim 11, wherein sediment comprises a lower density than the heavy elements.

13. The method of claim 8, further comprising forming riffles on the back end of the sifting scoop that transverse the sifting scoop and extend frontwardly from the back end of the sifting scoop to a central region of the sifting scoop.

14. The method of claim 13, further comprising isolating heavy elements using riffles, wherein the riffles isolate heavy elements from the sediment by density.

15. The method of claim 14, wherein the heavy elements comprise gold, silver, platinum, jewels, or gems.

16. A method of manufacturing a sifting scoop, the method comprising:

- machining the sifting scoop being an elongated half sphere, wherein the sifting scoop comprises a front edge, a left side wall curving upwardly along a left side of a floor, a right side wall curving upwardly from a right side of the floor, and a back wall curving upwardly from a back side of the floor, and the left side wall, right side wall, and back wall cooperate to define a reservoir and the floor extends forwardly from the back side;
- molding riffles into the floor, and traversing the one-piece main body from the left side wall to the right side wall, starting from a back end and extending forward to a central region of the sifting scoop;
- forming an opening into an internal face of the back end of the sifting scoop; and
- affixing a connection body comprising a top end, a bottom end, a central throughbore adapted to receive a fastener, and at least two openings for accepting a setting screw threaded through an external face of the connection body,
- into the opening located at the internal face of the back end of the sifting scoop.

17. The method of claim 16, further comprising welding around a joint between the connection body and the opening into the internal face.

* * * * *